(12) United States Patent
Lang

(10) Patent No.: US 7,636,430 B2
(45) Date of Patent: Dec. 22, 2009

(54) TOLL-FREE CALL ORIGINATION USING AN ALPHANUMERIC CALL INITIATOR

(75) Inventor: Alexander C Lang, Toronto (CA)

(73) Assignee: Intregan (Holdings) Pte. Ltd., Singapore (SG)

( * ) Notice: Subject to any disclaimer, the term of this patent is extended or adjusted under 35 U.S.C. 154(b) by 861 days.

(21) Appl. No.: 10/496,844

(22) PCT Filed: Oct. 31, 2002

(86) PCT No.: PCT/CA02/01635

§ 371 (c)(1),
(2), (4) Date: May 27, 2004

(87) PCT Pub. No.: WO2003/039128

PCT Pub. Date: May 3, 2008

(65) Prior Publication Data

US 2005/0084079 A1    Apr. 21, 2005

Related U.S. Application Data

(60) Provisional application No. 60/330,852, filed on Nov. 1, 2001.

(51) Int. Cl.
*H04M 3/42* (2006.01)

(52) U.S. Cl. .............................. 379/218.01; 379/210.01; 379/265.09

(58) Field of Classification Search ............ 379/218.01, 379/210, 188, 202, 210.01, 265.09
See application file for complete search history.

(56) References Cited

U.S. PATENT DOCUMENTS

| 7,269,163 | B1 * | 9/2007 | Koch et al. ................... 370/352 |
| 2001/0047391 | A1 * | 11/2001 | Szutu ......................... 709/206 |
| 2002/0188684 | A1 * | 12/2002 | Liang ......................... 709/206 |

FOREIGN PATENT DOCUMENTS

| EP | 0 952 723 | 2/1999 |
| WO | WO 98/35481 | 1/1998 |
| WO | WO 02/05532 | 7/2001 |

* cited by examiner

*Primary Examiner*—Curtis Kuntz
*Assistant Examiner*—Amal Zenati
(74) *Attorney, Agent, or Firm*—Seth H. Ostrow; Ostrow, Kaufman & Frankl LLP

(57) ABSTRACT

Toll-free calls are initiated using an alphanumeric call initiator (NAME) that is communicated to the network using a short message service (SMS), electronic mail message, a Worldwide Web interface or a voice connection to a voice recognition database. The NAME is translated to retrieve a directory number used to connect a calling party with the toll-free service subscriber. The directory number may be a toll-free number used to invoke incumbent translation services in the PSTN.

14 Claims, 16 Drawing Sheets

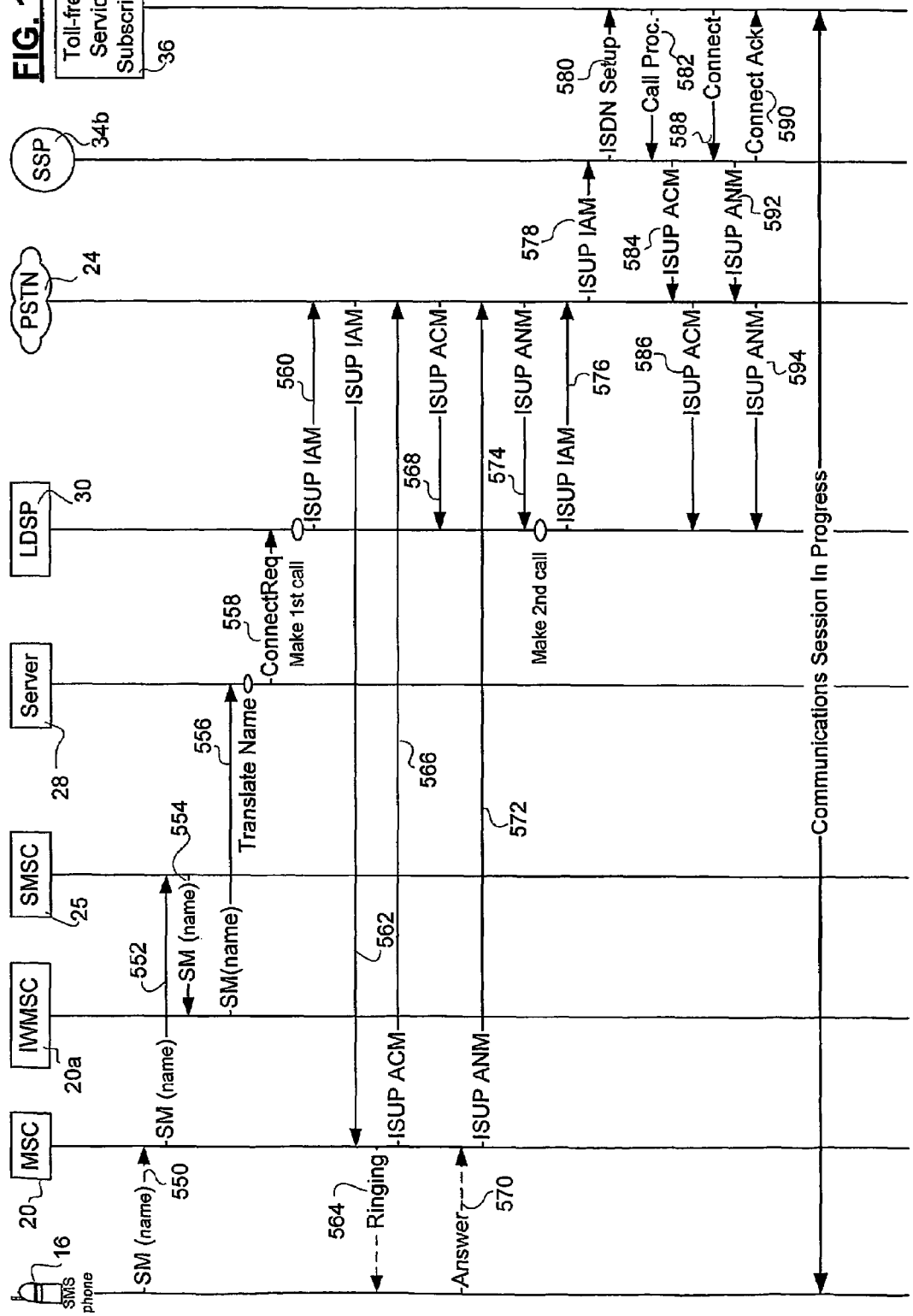

TOLL-FREE CALL ORIGINATION USING AN ALPHANUMERIC CALL INITIATOR

TECHNICAL FIELD

The present invention relates generally to toll-free call origination, and in particular to a system and method for effecting the establishment of a toll-free call using an alphanumeric string.

BACKGROUND OF THE INVENTION

Significant technical advances in the public switched telephone network (PSTN) have permitted toll-free service subscribers to overcome a disincentive that the public has to making long distance calls, namely the charge for the long distance call. The toll-free service was dramatically improved by Roy Weber's invention described in U.S. Pat. No. 4,191,860 entitled DATA BASE COMMUNICATION CALL PROCESSING METHOD. Weber introduced a toll-free call processing method that uses a database lookup for toll-free number translation. Weber's invention led to many beneficial improvements in toll-free service. Principally, because toll-free directory numbers are translated at the database, there is no need for the toll-free directory numbers to be associated with equipment terminations in the PSTN. The flexibility of distributing calls according to any predefined criteria, was thus enabled. Specifically, a company can now decide to have selected calls directed to a given department, a call center, or distributed among different numbers or call centers, depending on the time of day, area of call origination, caller profile/history, or any other criterion for which information is available.

While this has significantly improved toll-free service, difficulties remain with enabling the public to use toll-free directory numbers. One reason is that even though toll-free numbers are dissociated from PSTN terminations, they must still be looked up or remembered before a toll-free call can be made. Toll-free service providers have tried to make the service more convenient for the public by providing toll-free numbers that are associated with a brand, trademark or company name. These numbers are more easily remembered than are regular 10 digit numbers. The association is made between the letters and numbers on a standard phone keypad, on which each digit corresponds to three letters. For example, 1-800-356-9377 can represent 1-800-flowers. However, the use of an association of the letters with the digits on a telephone keypad severely limits the quantity of possible unique numbers, making those numbers highly valuable commodities that are available to only a select few.

U.S. Pat. No. 6,282,574 which issued Aug. 28, 2001 to Voit is entitled METHOD, SERVER AND TELECOMMUNICATIONS SYSTEM FOR NAME TRANSLATION ON A CONDITIONAL BASIS-AND/OR TO A TELEPHONE NUMBER. The patent describes an enhanced name translation server, for use on a packet data network such as the Internet, that executes a conditional analysis in response to at least some queries or requests for name translations, specifically Internet domain name translations. For example, the server may return a different destination address at different times or in response to translation requests from different terminals. The server can also query a primary destination terminal device, and conditions the response to the calling terminal on the status of the primary terminal. For example, if the primary terminal is live the server forwards the address of that terminal to the calling terminal device to set up communications. Otherwise, the server returns alternate destination address information. The server also supports a variety of different types of translations, including domain name to address, domain name to telephone number, and telephone number to address. However, Voit fails to provide any solution that is useful for toll-free service subscribers, especially those who are not in possession of a domain name.

PCT application PCT/US98/01419 entitled CIRCUIT-SWITCHED CALL SETUP USING A PACKET-SWITKCHED ADDRESS SUCH AS AN INTERNET ADDRESS OR THE LIKE describes a method and apparatus for setting up a telephone connection using an e-mail address. A character string is entered into an electronic system such as a personal computer, a deskset, smartphone, or a cellular smartphone. A determination is made as to whether the character string is a telephone number. If so, a desired telecommunications connection is established directly using the telephone number. If not, a preliminary telecommunications connection is established using the character string. The preliminary telecommunications connection may be to a mail server or a Web server. During the course of the preliminary telecommunications connection, a telephone number is received. Preferably, the first thing the user receives back is what the user wants, a phone number without any intermediate interaction. The telephone number is then used to establish the desired telecommunications connection. The method may be entirely automated to achieve in effect an Internet-based, world-wide, distributed telephone directory. However, this application likewise fails to provide any solution that facilitates toll-free call completion.

There is; therefore, a need for a system that simplifies toll-free calling by dissociating the toll-free call initiation process from dependence on any telephone number assignment, and even the numbering plan used in the PSTN.

SUMMARY OF THE INVENTION

It is therefore an object of the invention to provide a system and method for effecting the establishment of a toll-free call in response to an alphanumeric message containing a name associated with a toll-free service subscriber to be called.

The invention therefore provides a method for providing toll-free call origination in a switched telephone network CHARACTERIZED BY:

receiving a toll-free call initiation request message from a message sender connected to a data network, the toll-free call initiation request message being in a predefined format containing a name of a toll-free service subscriber and a telephone number specified by the message sender from which the toll-free call is to be originated;

using the name to determine a directory number to be used to complete the call to the toll-free service subscriber; and initiating a call connection between the telephone number specified by the message sender and the toll-free service subscriber.

The invention further provides a system for providing toll-free call origination CHARACTERIZED BY:

means for receiving a toll-free call initiation request message in a predefined format containing a name identifying a toll-free service subscriber and a telephone number to be used as a call originating number for the toll-free call;

means for using the name to determine a toll-free directory number; and means for initiating a call connection between the telephone number to be used as the call originating number for the toll-free call and the toll-free directory number.

The invention therefore enables a number of practical ways for sending a toll-free call initiation message to establish a toll-free call. One way involves inserting a name and an originating number into a short message service (SMS) messages (SMs), in conformance with a predefined format. A second way involves an Instant Message or e-mail message issued from a wireless communications device; such devices including personal digital assistants (PDA), and wireless application protocol (WAP) phones, to name a few examples. Networked computers may generate the toll-free call initiation message, and send it either over a packet network or the Internet. Finally, a caller may initiate the toll-free call initiation message by speaking the name to a voice recognition database, and supplying the call initiation number.

As used in this document, an "alphanumeric call initiator" means any alphabetic, alphanumeric, or numeric string (except a telephone number that conforms to a known numbering plan), such as a company name, a person's name, a trademark, a product name, a nickname, a phrase or an acronym, etc. Examples or acceptable alphanumeric call initiators include. "Coke", "Pepsi", "Jane Doe", "GMC", "FORD", "Big Boy", "Have a Nice Day", "We try harder", "123", "925", etc.

BRIEF DESCRIPTION OF THE DRAWINGS

Further features and advantages of the present invention will become apparent from the following detailed description, taken in combination with the appended drawings, in which:

FIG. 17 is a call flow diagram illustrating principal steps in accordance with the invention for initiating a call using an SMS enabled telephone when a long distance service provider performs call setup.

It will be noted that throughout the appended drawings, like features are identified by like reference numerals.

DETAILED DESCRIPTION OF THE PREFERRED EMBODIMENT

The present invention provides systems and methods for initiating toll-free telephone calls using alphanumeric call initiators to simplify the establishment of a voice connection for communication between a toll-free service subscriber and a calling party.

Figure 1:
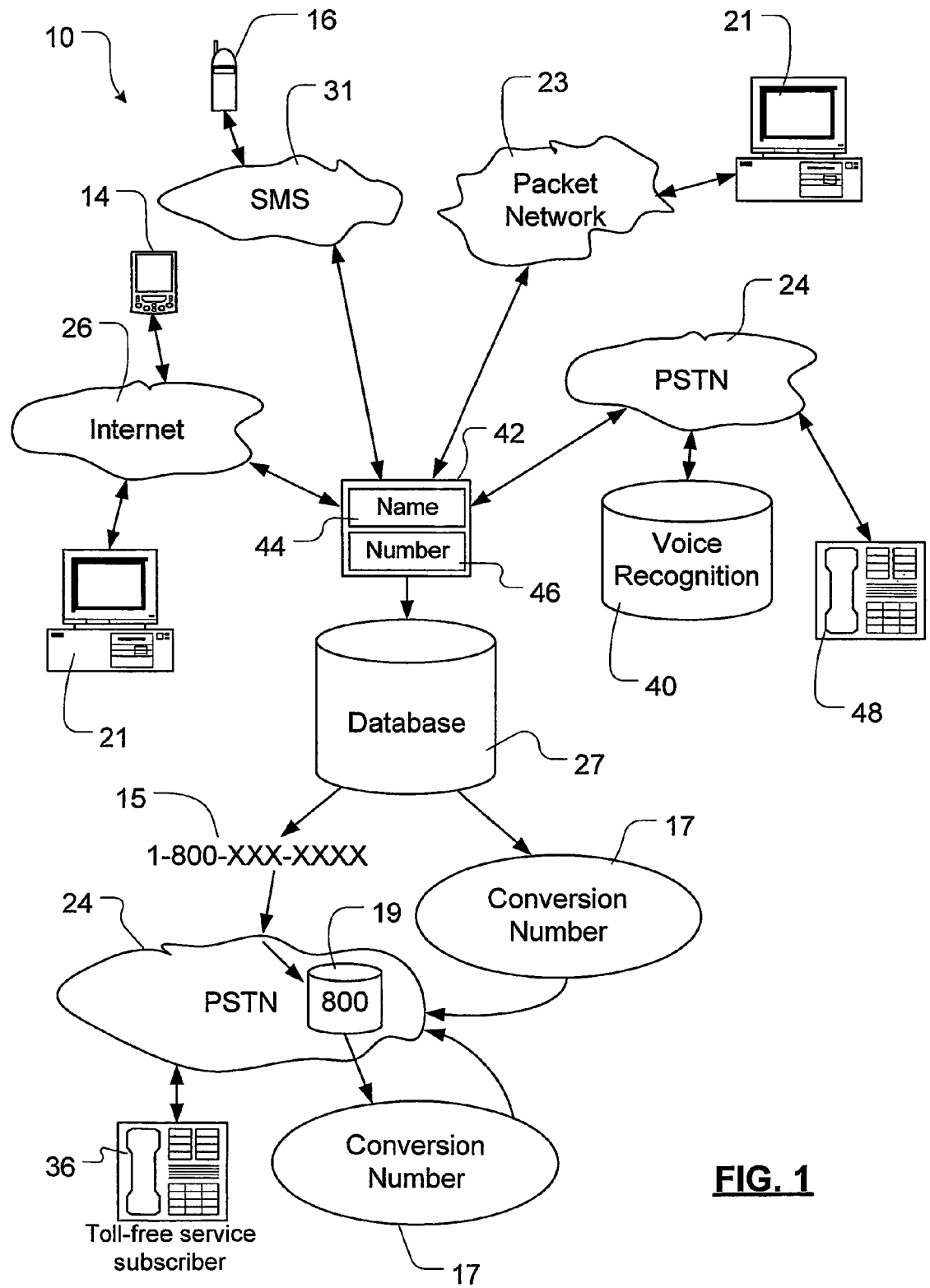
FIG. 1 schematically illustrates communication options that may be used to initiate a toll-free call using a system in accordance with the invention.

FIG. 1 illustrates various ways of initiating the toll-free call to toll-free service subscriber 36. A call initiator message 42 includes an alphanumeric call initiator 44, hereinafter referred to simply as a "NAME" 44, that is used to identify the toll-free service subscriber. The call initiator message 42 is generated using any one of a Voice Recognition unit accessed using a telephone 48 connected to the public switched telephone network (PSTN) 24; a networked computer 21 connected to a packet network 23; a personal digital assistant (PDA) 14 that communicates wirelessly through the Internet 26; a short message service (SMS) enabled telephone 16 that is connected to a short message service (SMS) network 31; or any other device adapted to send an alphanumeric message to a specified receiver. The NAME 44 is converted by a database 24 into a number that may be used to connect with the toll-free service subscriber directly (a conversion number 17), or a "1-800" number that is passed to incumbent toll-free translations services (800 database 19) in the PSTN 24, where it is converted to a conversion number 17 in a manner well known in the art. The call initiating party also provides a telephone number 46 associated with a voice terminal to serve as an originating number for the call. As will be understood by those skilled in the art, the toll-free service subscriber can be any one of a company, an organization, as association or an individual who wishes to receive all, or only selected calls without charge to the calling party. The NAME 44 may be any alphanumeric string that uniquely identifies the toll-free service subscriber, and may be, for example, a trademark, personal name, a slogan, a company name, or any another unique identifier adopted by the toll-free service subscriber and communicated to parties from which the toll-free service subscriber is willing to accept calls.

Figure 2:
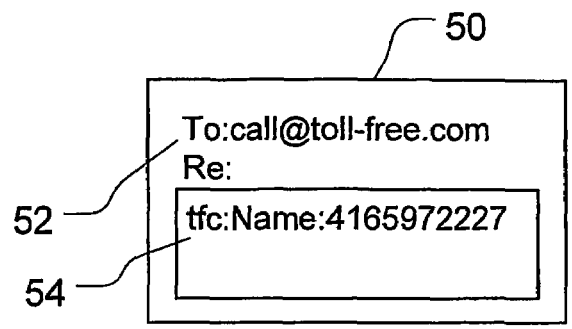
FIG. 2 schematically illustrates a user interface for initiating a toll-free call in accordance with the invention using a wireless email deceive.

FIG. 2 schematically illustrates an interface that can be used to generate an email message for initiating a toll-free call in accordance with the invention. The interface is exemplary to interfaces that are provided on wireless electronic mail or wireless application protocol (WAP) telephones. The interface 50 provides a first field 52 for receiving an email address to which the message is to be sent. The address entered is the address of a telephone service provider, such as a long distance service provider of the call initiating party, for example. A message field 54 permits the call initiating party to enter a call initiator message. The message includes, for example, a call initiator string in the format of: command: NAME: originating telephone number. The command is any string recognized by the service providers equipment to be used to initiate the toll-free call. In this example the command is "tfc" for "toll-free call". The NAME is, as described above, ay unique identifier adopted by a toll-free service subscriber. The NAME is registered in the database 27 (FIG. 1) of toll-free service subscribers.

Figure 3A:
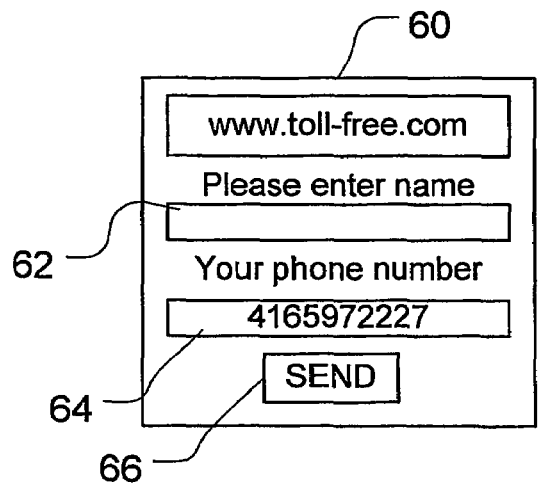
FIGS. 3a,b schematically illustrate exemplary user interfaces for communications devices that provide alternate means for initiating a toll-free call in accordance with the invention.

FIG. 3*a* schematically illustrates a web page 60 that may be used to initiate a toll-free call is accordance with the invention. The web page 60 provides a form in which users enter the NAME at 62 and the originating telephone number at 64. A send button 66 initiates the call by forwarding the message to the toll-free service provider, in this example, a company called "toll-free.com".

Figure 3B:
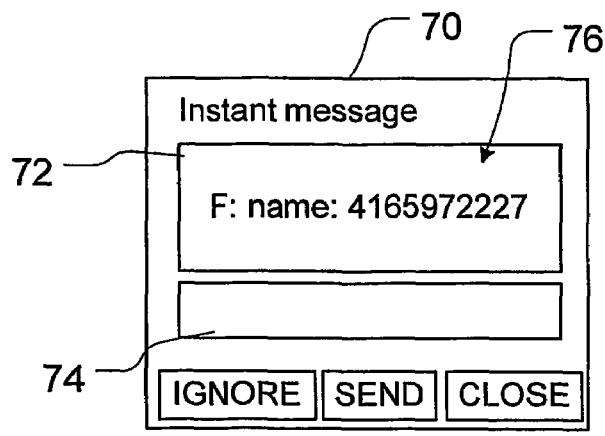

FIG. 3*b* schematically illustrates another interface for sending alphanumeric messages for initiating toll-free calls. This interface is used for Instant Messaging, which is well known in the art. The instant messaging is sent to the toll-free service provider in a manner known in the art. The instant message interface 70 typically includes a message window 72 and a reply window 74. The message 76 in the format described above with reference to FIG. 2 is entered in the message window 72 and sent using the "send" button. In this example the command is simply "F", for "freephone".

Figure 4:
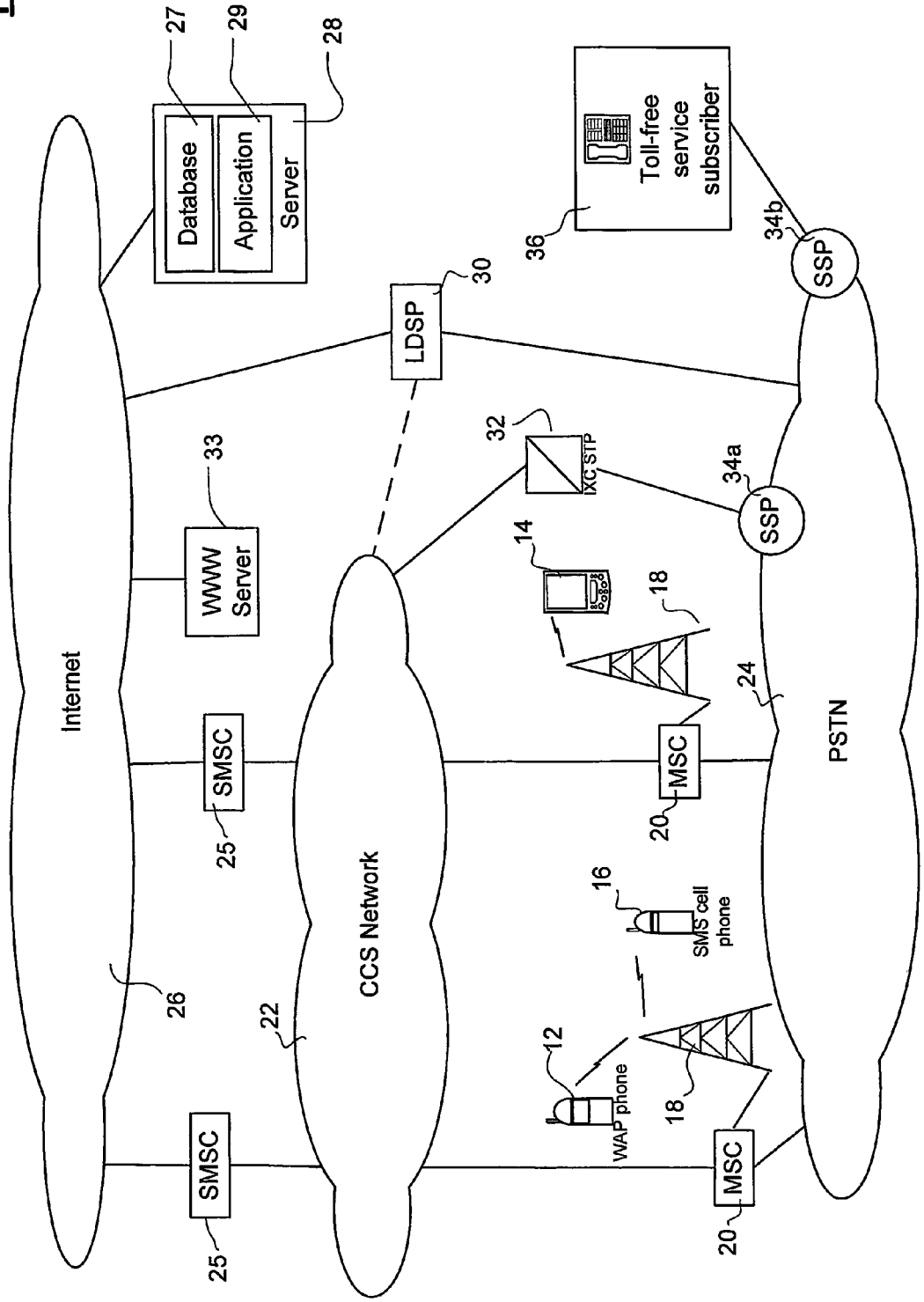
FIG. 4 schematically illustrates principal elements of one embodiment of a system for initiating toll-free calls in accordance with the invention.

As schematically illustrated in FIG. 4, a first embodiment of a system in accordance with the invention receives toll-free call initiation messages from short message service (SMS) enabled devices. A plurality of different types of mobile personal communications devices, such as a wireless application (WAP) telephone 12, a wireless communication enabled personal digital assistant (PDA) 14, or a SMS enabled cellular telephone 16, which are registered to use and designed to support SMS are in wireless communication with a plurality of base stations 18. Each base station 18 is connected to a mobile service center (MSC) 20, which is connected to a common channel signal (CCS) network 22, and a public switched telephone network (PSTN) 24. In a manner known in the art short message service centers 25 (SMSCs) are typically connected to both the CCS network 22 and an Internet 26. A long distance service provider (LDSP) 30 provides toll-free telephone service to a plurality of toll-free service subscribers 36.

A call connection can also be established by sending messages via an inter-exchange carrier signal transfer point (STP) 32 to an inter-exchange carrier service switching point (SSP) 34*a*, which establishes telephone connections upon receipt of CCS TCAP messages. As is known in the art, the PSTN 24 comprises a plurality of SSPs 34 that can establish, and take down call connections over trunks in the PSTN 24. The CCS network 22 also includes a plurality STPs that route call control signaling messages between switches in the PSTN 24. As is known in the art, there are a plurality of competing interoffice carrier networks each having a respective inter-exchange carrier identification (IXC-ID).

As is known in the art, SMS messages are relayed to the MSC 20 by a base station 18 that receives the clearest signal from the message sending wireless device. The MSC 20 determines the message to be a SMS message, and forwards it to an short message service center (SMSC) 25 through the CCS network 22. As is known in the art a gateway MSC (GMSC) and/or an interworking MSC (IWMSC), may first receive the SM and forward the SM to the SMSC 25. The SMSC 25 in the illustrated embodiment incorporates the functionalities of the GSMC and IWMSC.

The SMSC 25 stores and forwards SMs in a manner known in the art. In accordance with the present embodiment of the invention, the SMSC 25 also queries a toll-free SMS database 28 if the SM has no specified destination number (DN). The query message sent to the database 28 includes an alphanumeric string contained in the SM and may include the originating number supplied by the sender of the SM. The query is responded to and the SMSC 25 is adapted to determine if the response is successful. If the response is successful, the SMSC extracts a conversion number (CN), and possibly either an IXC-ID, or an identifier of an LDSP 30, from the response. Otherwise, if the response indicates that the specified alphanumeric string is not registered, the SMSC 25 generates and forwards a second SM to the sender, indicating that.

The toll-free SMS database 28 receives messages of a certain format from a plurality of SMSCs 25, and translates the alphanumeric string in the message to determine at least one conversion number (CN) associated with a toll-free service subscriber. A CN is selected according to criteria in a manner known in the art for selecting terminations for toll-free call requests, and a reply message is returned to the issuing SMSC 25. In particular a selection algorithm adapted to select one of the toll-free directory numbers may use information particular to the directory number associated with the sender, such as location or roaming information, availability of the telephone equipment serving the toll-free directory numbers, the time of day, and information supplied by the sender or the toll-free service subscriber, for example.

Figure 5:
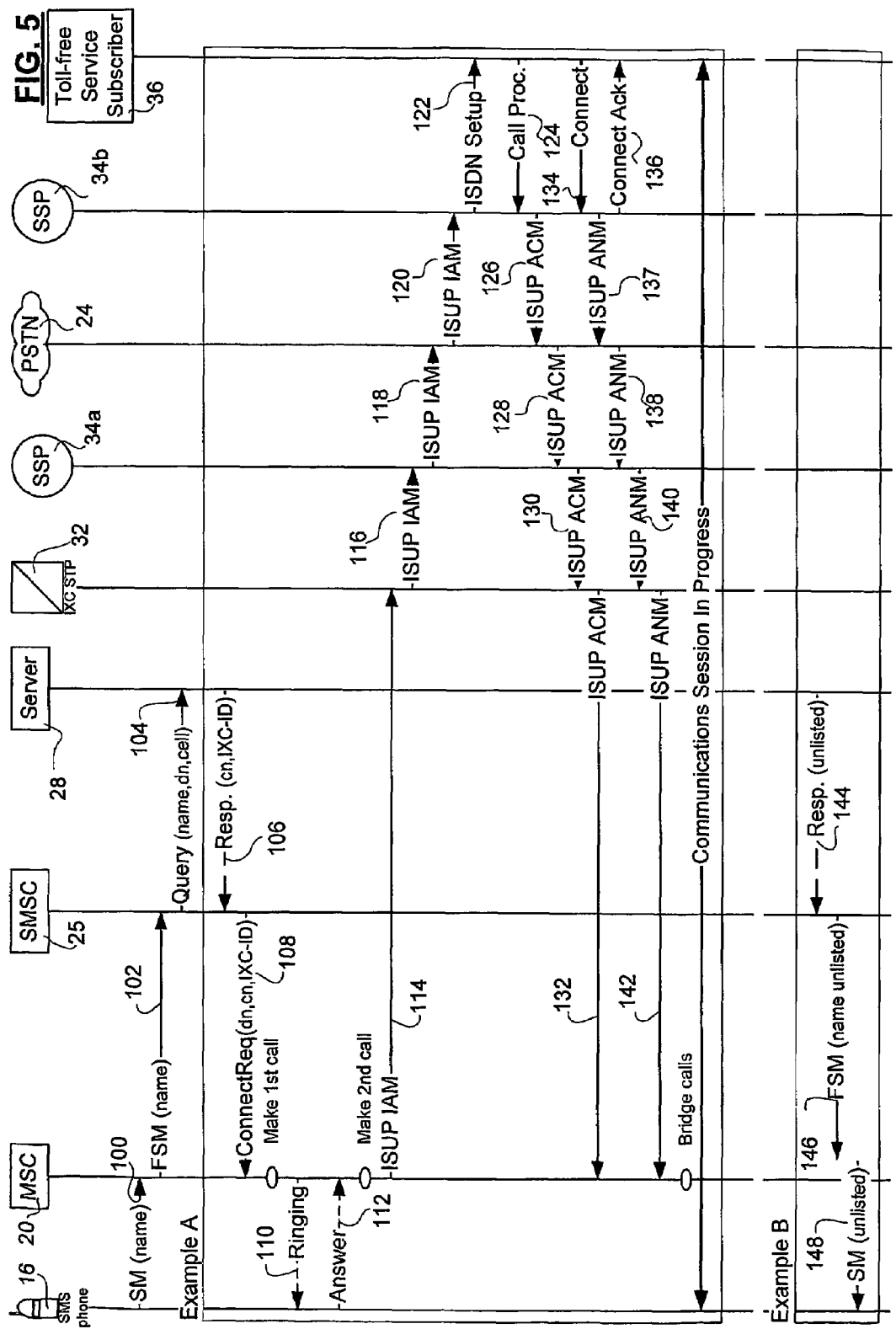
FIG. 5 is a call flow diagram illustrating principal steps involved in initiating a call using the system illustrated in FIG. 4 from a SMS enabled cellular telephone, when an MSC performs call setup.

FIG. 5 illustrates principal steps of a call flow during establishment of a long distance call using one example of a SMS message. In step 100, a SMS message is sent by a sender using the SMS enabled cellular telephone 16. The SM in this example is sent without a destination number, and the SMS enabled telephone is adapted to accommodate that option. In a manner known in the art this SMS message is broadcast to a base station 18, and from there it is forwarded to an MSC 20. The MSC 20 receives the SM, identifies it as a short message, and forwards it to SMSC 25 for routing to a recipient (step 102). The SMSC 25 inspects the SM, determines that no DN was supplied in the SMS message, and so initiates a toll-free call procedure for the sender. In step 104, the SMSC 25 issues a query message to the toll-free database server 28 using any one of a number of protocols known in the art that are supported by Internet protocol (IP) networks. It should also be understood that the database server 28 could be connected to the CCS network 22, in which case the SMSC could send a common channel signaling transaction capability application part(TCAP) message to query the database. The query message conforms to an application layer protocol used by the toll-free database server 28 and contains all information that is expected by the server 28 to determine a termination for the call. In the present embodiment, the NAME 44 and the originating number (ON) 46 supplied by the message sender are contained in the query message. If an originating number is not specified, the senders cellular telephone number is assumed to be the originating number 46. The toll-free database server 28 performs a search algorithm using the information supplied to it in the query, to determine a termination for the call.

It this example the toll-free database server 28 determines a termination for the call, that is, the conversion number (CN). The toll-free database server 28 also identifies an IXC-ID that is to initiate the call. In step 106, the server 28 sends a response to the SMSC 25 that includes the CN and IXC-ID.

The SMSC 25 receives the response, and determines, using information supplied in the response initiates two legs of the call between the ON associated with the SMS message sender, and the CN. In this example, the MSC 20 is adopted to handle the initiation of the two calls.

In step 108, the SMSC 25 sends the MSC 20 a connection request message containing the ON associated with the SMS message sender, the CN, and the IXC-ID. The MSC 20 is provisioned with a capacity to originate first and second calls, and to bridge the calls after they are set up. As will be understood by those skilled in the art, an adjunct processor my be required. The MSC 20 proceeds to make the call to the SMS phone 16, applying ringing to the sender's telephone 16, which was used to send the SMS message (step 110). The sender answers the cellular telephone (step 112), which is detected by the MSC 20, and prompts the MSC 20 to initiate the establishment of a call connection to the CN. To this end the MSC 20 issues an integrated services digital network user part (ISUP) initial address message (IAM) addressed to the specified IXC (step 114), which in this example has a point-of presence (POP) at SSP 34a. The IXC STP 32 routes the IAM to the SSP 34a (step 116), and, in step 118, the IAM is forwarded, hop-by-hop through the PSTN 24, trunks for the call connection being reserved as it progresses, until it is forwarded to the SSP 34b. The SSP 34b forwards an ISDN setup message over an ISDN trunk to the toll-free service subscriber 36. An automatic call proceeding message is returned from the toll-free service subscriber 36 (step 124), and the SSP 34b issues an ISUP address complete message (ACM) that is returned through the PSTN to the MSC 20. In a manner known in the art, the ACM is relayed hop-by-hop across the PSTN 24 updating the status of the call connection at each switch as it proceeds (step 126). The ACM is relayed to SSP 34a, through IXC STP 32, and to MSC 20, in steps 128, 130, and 132, respectively.

Once the toll-free service subscriber 36 has answered the call, an ISDN connect message is sent to the SSP 34b (step 134). The SSP 34b, acknowledges the connect message (step 136) and initiates a similar cascade of relayed ISUP answer messages (ANMs) through the PSTN 24 (step 137), to the SSP 34a (step 138), through the IXC STP 32 (step 140), and to the MSC 20 (step 142). The call connections to the MSC are now complete. The MSC 20 bridges the two call connections and a communication session between the toll-free service subscriber 36 and the sender is underway.

In example B, the SM is received by the server 28, and translation of the alphanumeric string returns an indication that the requested name is not listed. This message is sent to the SMSC 25 (step 144) in response to the query of step 104. The SMSC 25 is programmed to, upon receipt of such a message, generate a reply to the SM indicating that the requested name is not listed. The SM is forwarded to the MSC 20 (step 146), and from there transmitted to the sender (step 148).

In alternative embodiments the SMSC 25 may wait for a response from the server 28 before returning a delivery report to the MSC 20. The SMSs known in the art provide a means for automatic response to SMs. Each SM is acknowledged upon delivery so that the sender receives feedback that the SM has been delivered, or if the message has not been delivered, an automatic unsuccessful delivery response is sent along with the reason for the delivery failure. The SM delivery reports include response codes that can be assigned interpretations by users, service providers, or application designers. One of the response codes is used to indicate that the sent SM contains a name that is not listed, in accordance with the alternative embodiment.

Figure 6:
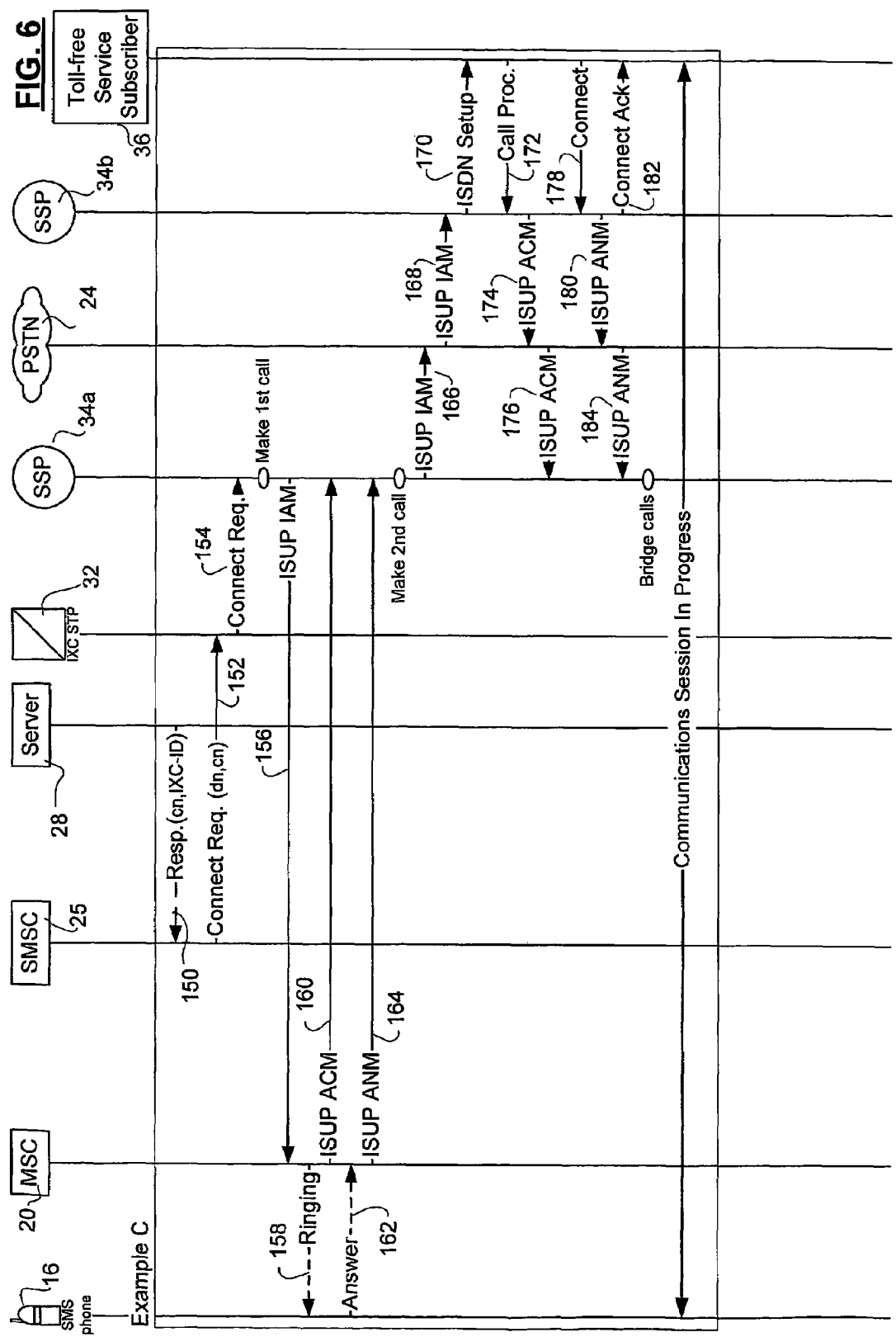
FIG. 6 is a call flow diagram illustrating principal steps involved in initiating a call using the system illustrated in FIG. 4 from a SMS enabled cellular telephone when an inter-exchange carrier performs call setup.

In example C shown in FIG. 6, the server 28 translates the alphanumeric string and obtains both an IXC-ID and a CN. In step 150, the server 28 forwards this information to the SMSC 25 in a response to the query of step 104. The SMSC 25 extracts the CN and IXC-ID from the response, and determines a point in the PSTN 24 at which to originate the call. In example C, the determined point is the SSP 34a that serves as a POP of the IXC specified in the response from the server 28. Consequently, the SMSC 25 issues a connection request message, which may be carried by one or more TCAP messages through the IXC STP 32 (step 152) to SSP 34a (step 154). The SSP 34a is provisioned in the same way as the MSC 20 described above and, as directed by the connection request, first initiates the establishment of a call connection to a first DN included in the connection request (the DN of the sender's SMS cellular telephone 16). An IAM is issued to the MSC 20 (step 156). The MSC 20 determines that the SMS cellular telephone 16 is available to take a call, applies ringing to the SMS cellular telephone 16 (step 158), and returns an ACM to the SSP 34a (step 160). When the SMS cellular telephone 16 goes off-hook (step 162), the MSC 20 issues an ANM to the SSP 34a (step 164), and a call connection to the sender is complete.

The SSP 34a then initiates a second call connection to the CN included in the connection request with an IAM forwarded through the PSTN 24 (step 166) to the SSP 34b (step 168). The SSP 34b issues an ISDN setup message to the toll-free service subscriber 36 (step 170), which returns a call proceeding message (step 172). The SSP 34b initiates a cascade of ACMs through the PSTN 24 (step 174), to the SSP 34a (step 176). Similarly, once the toll-free service subscriber 36 indicates that the call has been answered, and an ISDN connect message is issued to the SSP 34b (step 178) and acknowledged (step 180), the SSP 34b initiates a cascade of ANMs through the PSTN 24 (step 182), to the SSP 34a (step 184). The SSP 34a then bridges the two call connections and the communications session is underway.

Figure 7:
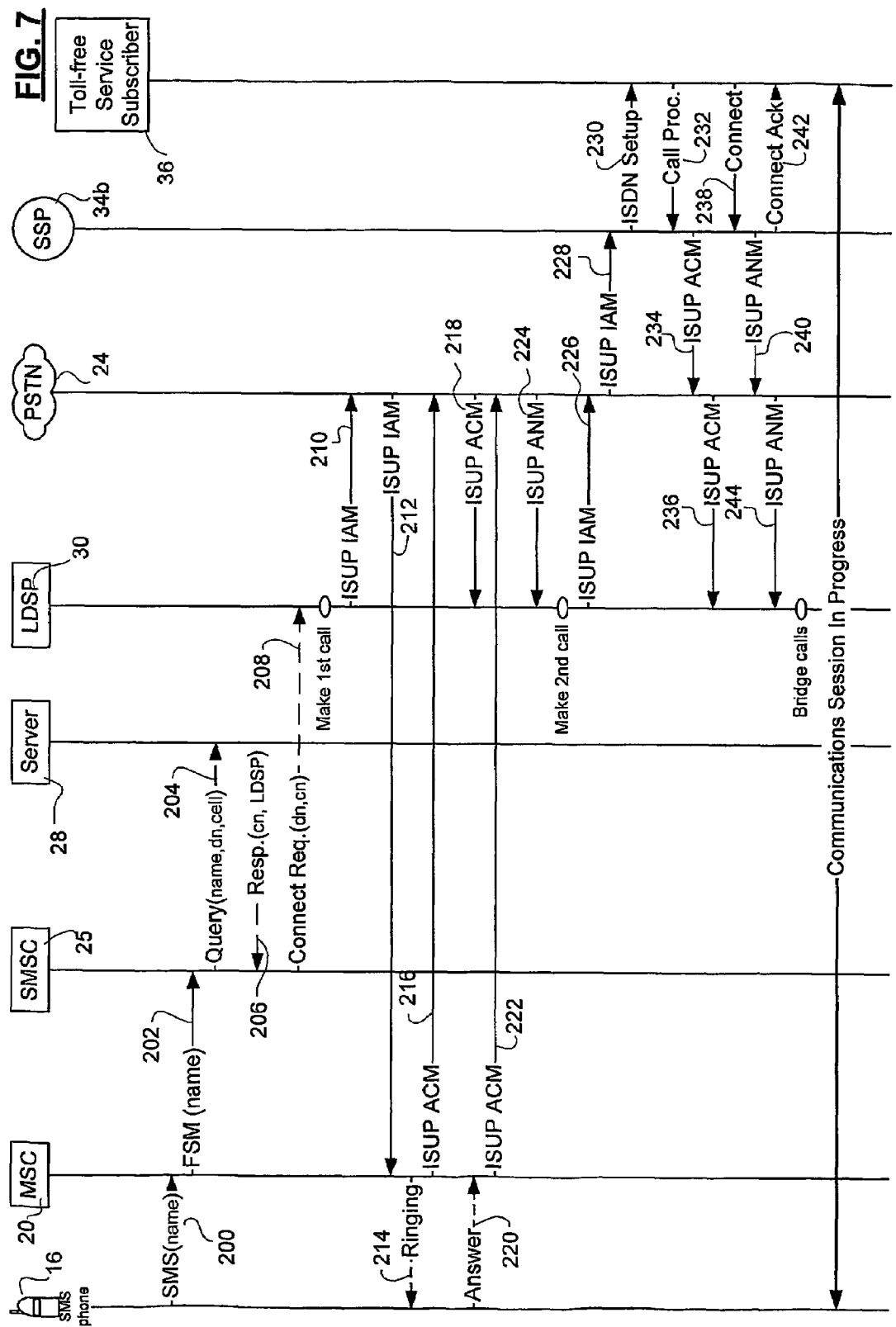
FIG. 7 is a call flow diagram illustrating principal steps involved in initiating a call using the system illustrated in FIG. 4 from a SMS enabled cellular telephone when a long distance service provider performs call setup.

In yet another example shown in FIG. 7, the call connections are initiated and bridged by the LDSP 30. Steps 200-204 are identical to steps 100-104, respectively. The server 28 receives the alphanumeric string entered by the sender, along with the sender's DN, and the cell that the sender is calling from, from the query of 204, and translates the alphanumeric string to obtain a list of CNs of respective toll-free service subscribers associated with the name. The server 28 then selects one of the CNs and the carrier for the call. In this case the server 28 selects the LDSP 30 to serve the call. The selected CN and LDSP 30 are sent in a message to the SMSC 25 in step 206, which prompts the SMSC 25 to formulate and send a message to the LDSP 30 requesting a call connection be established between the DN and CN (step 208).

The long distance service providers (LDSPs) 30 provides long distance service to subscribers. Some LDSPs 30 offer a worldwide web interface that permits subscribers to initiate call requests. As is known in the art, a subscriber can issue a request to the worldwide interface that conforms with a predefined protocol, and contains the required information for call completion. A first call connection to the directory number associated with, or supplied by, the subscriber is established from a POP in the PSTN 24. A second call connection is then established from the POP to a second directory number specified in the request and the two calls are bridged together. The LDSP 30 is provisioned to provide service in this way, and the connection request sent in step 208 conforms to a protocol required by the LDSP 30. The location of the POP from which the call connections are initiated and bridged may determine a cost of the call, especially for cellular telephone calls to which roaming charges may apply if the cell phone is used outside of a HLR service area.

The LDSP 30 initiates the first call connection to the SMS sender by sending an ISUP IAM through the PSTN 24 (step 210) to the MSC 20 (step 212). The MSC 20, in response, applies ringing to the SMS cellular telephone 16 (step 214), and returns an ACM that is forwarded through the PSTN 24 (step 216) to the LDSP 30. When the SMS cellular telephone 16 is answered (step 220), the MSC 20 issues an ANM that, is forwarded hop-by-hop through the PSTN 24 (step 222) to the LDSP 30 (step 224).

The LDSP 30 then initiates a second call connection to the CN. In step 226, the IAM is sent to a first switch in the PSTN 24, and the IAM is forwarded hop-by-hop through the PSTN 24 toward the toll-free service subscriber 36. It is forwarded to the SSP 34b in step 228. The process for establishing the call through the integrated services digital network (ISDN) trunk to a toll-free service subscriber is repeated in steps 230-244, which are identical to steps 170-184 (except that the LDSP 30 serves as the call initiator and not the SSP 34a). The LDSP 30 effects the bridging of the two call connections and the communication session is underway.

Figure 8:
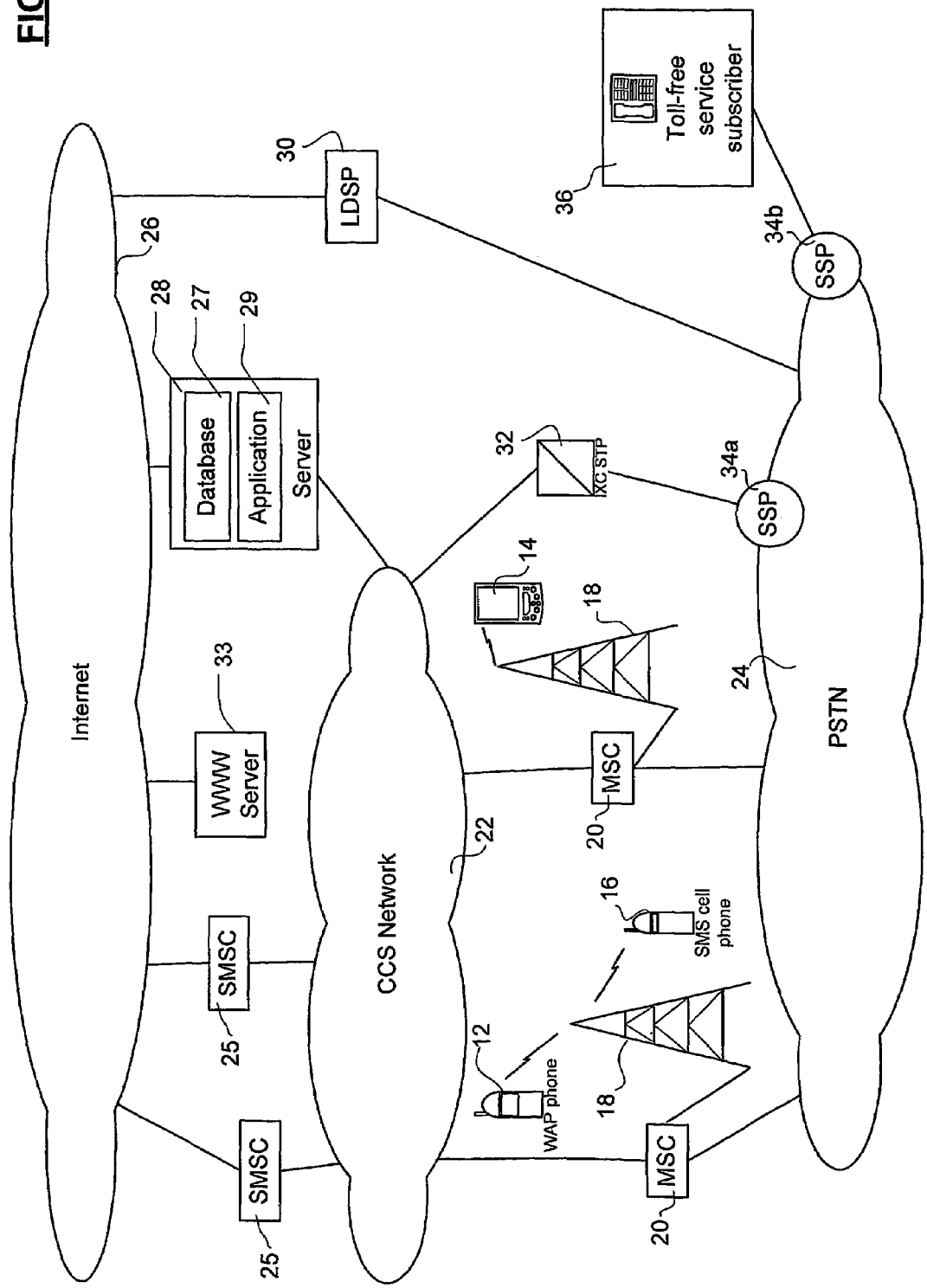
FIG. 8 schematically illustrates principal elements of another embodiment of a system for initiating a toll-free call in accordance with the invention.

There are many network configurations that are functionally equivalent to the one depicted in FIG. 4. For example, FIG. 8 illustrates an embodiment wherein the signaling between the MSC 20, SMSC 25 and server 28 is carried by the CCS network 22 using TCAP messages. For this purpose, in the embodiment illustrated in FIG. 8, the server 28 is connected with the CCS network 22. The server 28 also may be connected to the Internet 26, as illustrated, to facilitate network management and administration procedures not directly related to the involvement of the server 28 in the present invention.

Figure 9:
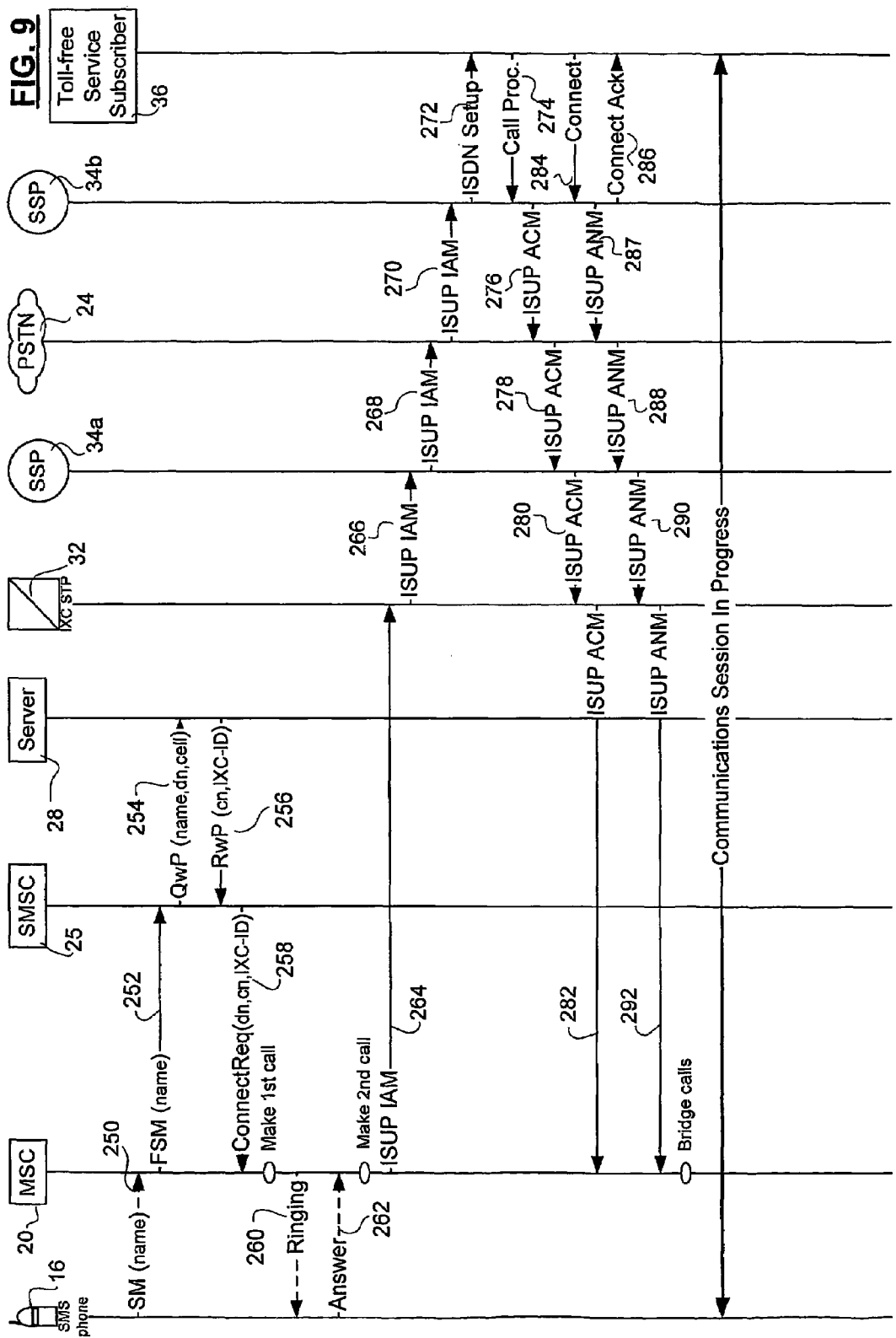
FIG. 9 is a call flow diagram illustrating principal steps involved in initiating a call using the system illustrated in FIG. 8 from a SMS enabled cellular telephone when an MSC and an inter-exchange carrier are used to perform call setup.

FIG. 9 illustrates a call flow of principal messages used to establish a call connection between a sender of a SM, and a toll-free service subscriber 36 identified in the SM, in accordance with the embodiment of the invention illustrated in FIG. 8.

In step 250, the SMS sender issues the SM containing an alphanumeric call initiator that includes the NAME 44. The SM is received at the MSC 20 and forwarded to the SMSC 25, in step 252. The SMSC 25 formulates and sends a TCAP query with permission (QwP) message to the server 28 (step 254), as the SM contained no DN, but contained the NAME 44. The server 28 translates the NAME 44, and determines a CN for the call, along with (in this case) an IXC-ID. The CN and IXC-ID are sent to the SMSC 25 in a TCAP response with permission (RwP) message in step 256. Steps 258-292 are identical to steps 108-142 described above with reference to FIG. 5.

Figure 10:
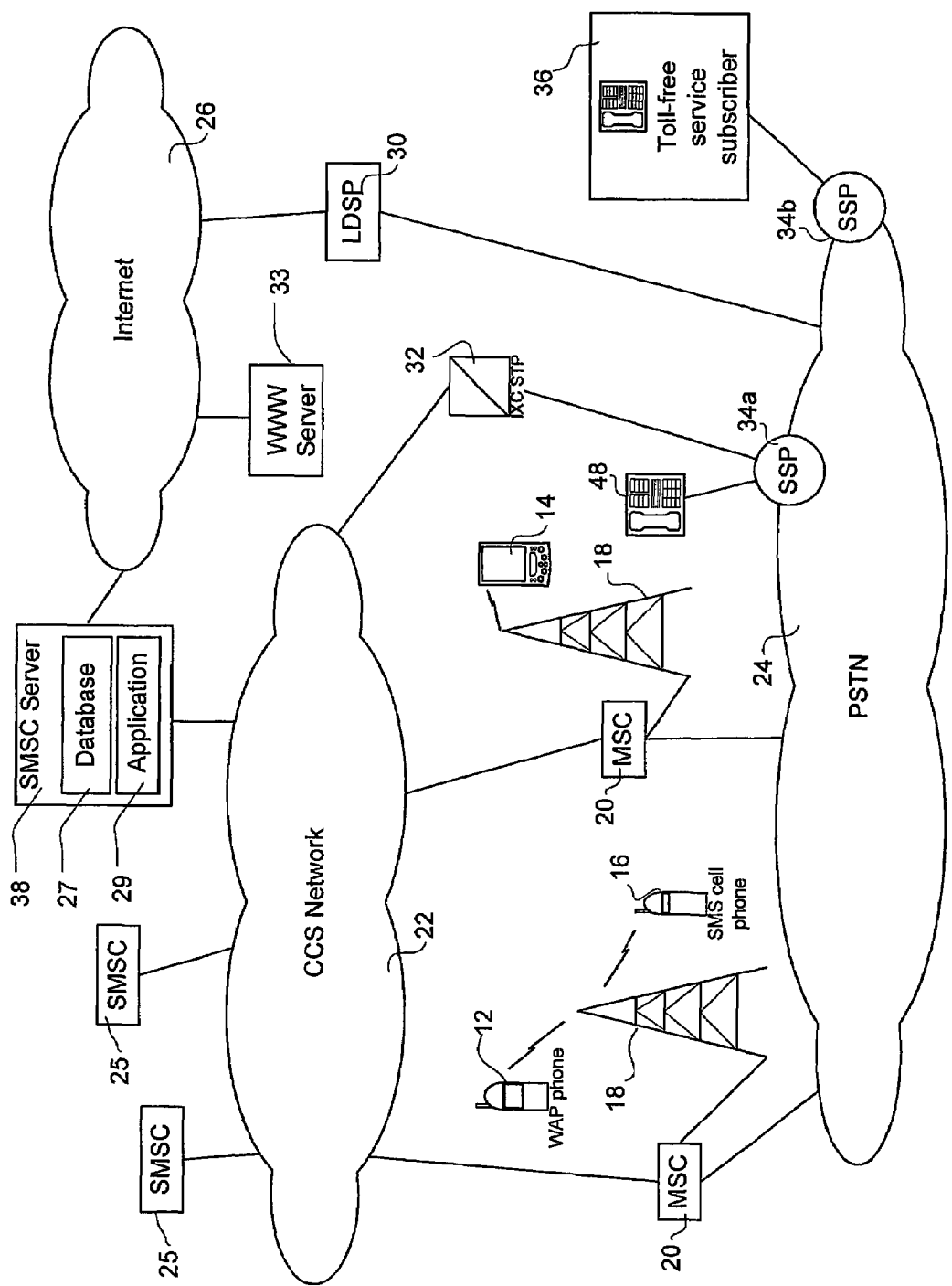
FIG. 10 schematically illustrates principal elements of yet another embodiment of a system for initiating a toll-free call in accordance with the invention.

FIG. 10 is a schematic diagram of principal components of another embodiment of a system in accordance with the invention. In accordance with this embodiment, a SMSC server 38 is adapted to receive SMs, extract a NAME 44 contained therein, and use available information regarding the call and the NAME 44 to obtain a CN for the call, as well as a carrier for the call, and optionally, particulars about where to initiate the call.

Preferably the sender's SMS cellular telephone 16 specifies the toll-free SMSC database 38 instead of a SMSC 25 that may usually provide the SMS to the sender. Otherwise the SM may be forwarded to the SMSC server 38 by an SMSC 25, in which case the SMSC server 38 emulates a MSC 20 to the SMSC 25. The SMSC server 38 has access to information related to the sender if it receives the SM directly.

The SMSC server 38 is further adapted to interface with the CCS network 22 and Internet 26 in order to request call connections by SSPs that serve as POPs of IXCs (such as SSP 34a), and LDSPs 30, respectively. The SMSC server 38 is adapted to perform all of the SM routing, forwarding, and storing duties of a SMSC and also the translation and selection functions of the server 28.

Figure 11:
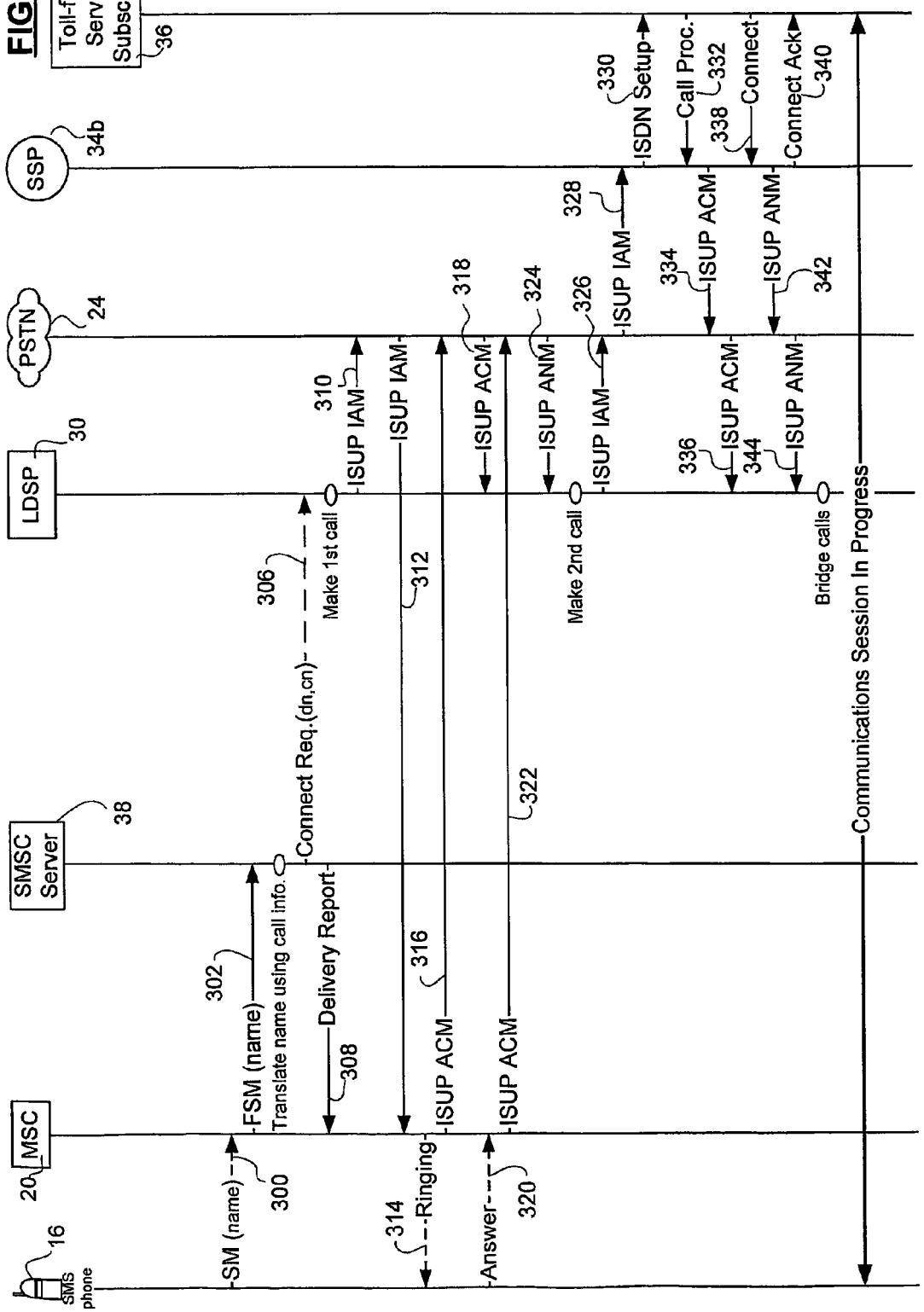
FIG. 11 is a call flow diagram illustrating principal steps of initiating a call using the system illustrated in FIG. 10.

FIG. 11 illustrates a simpler call flow for establishing the call connection in response to a SM in an embodiment of the system schematically illustrated in FIG. 10.

In step 300, the SM is sent to MSC 20 by the SMS sender using the SMS cellular telephone 16. The SM is forwarded by the MSC 20 to the SMSC server 38 (step 302), which, given that there is no DN associated with the SM, extracts a NAME 44 from the SM and translates the alphanumeric string, using a data store, to retrieve a set of CNs associated with a subscriber that has registered the alphanumeric string. The SMSC server 38 then selects one of the CNs to receive a call from the SMS sender according to predefined criteria. The SMSC server 38, in its capacity as a SMSC, issues a delivery report to the MSC 20, acknowledging the successful delivery of the SM, once the translation of the NAME 44 is completed (step 308). It is assumed in the present example that the SMSC server 38 determines that the call is to be made to a selected CN, through a specified LDSP 30. Consequently the SMSC server 38 issues a connection request through the Internet 22, requesting a call connection between a DN associated with the sender, and the CN. It is assumed that the sender is also a subscriber to the services of the LDSP 30, and so the call is made to the sender first, and the CN second. Steps 310-344 are identical to steps 210-244 described above, and the description of the remainder of the call flow is not repeated.

Figure 12:
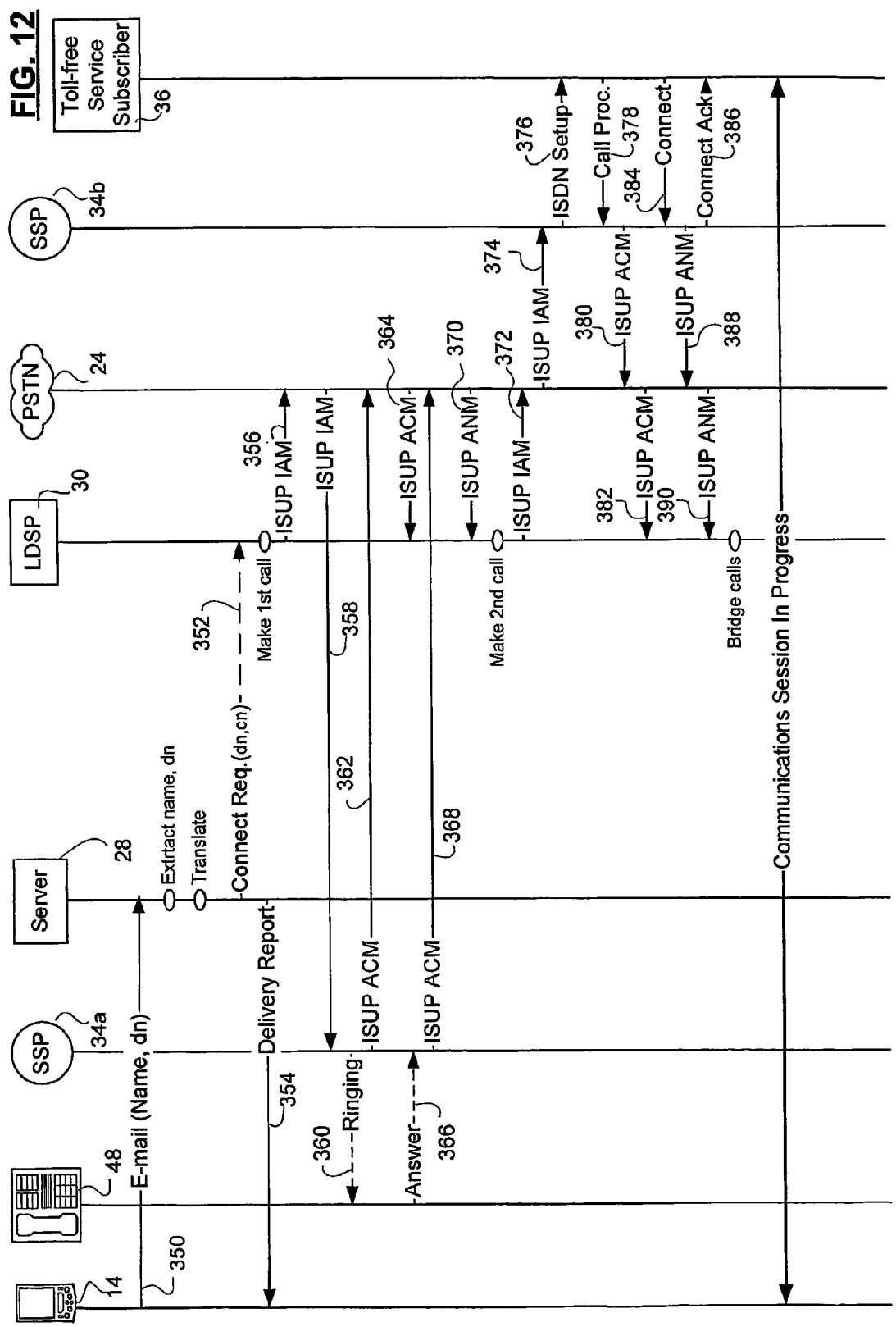
FIG. 12 is a call flow diagram illustrating principal steps in accordance with the invention for initiating a toll-free call using an e-mail text message sent from a PDA.

FIG. 12 is a call flow diagram that schematically illustrates how a PDA may generate the alphanumeric call initiator containing a NAME 44 using an e-mail message sent to the server 28 (FIG. 8). As shown in FIG. 12, a calling party using a personal digital assistant (PDA) 14 sends an electronic mail message using, for example, an interface such as shown in (FIG. 2) to the server 28. The server 28 extracts the NAME 44 and originating number (DN) and translates the NAME 44 to provide a CN. The translation provides the conversion number as well as an ID of a long distance service provider (LDSP 30). The server 28 therefore sends a connection request message through the Internet 26 (step 352) to the LDSP 30. Thereafter (steps 356-390) the call setup is identical to that described above with reference to FIG. 11 and steps 310-344.

Figure 13:
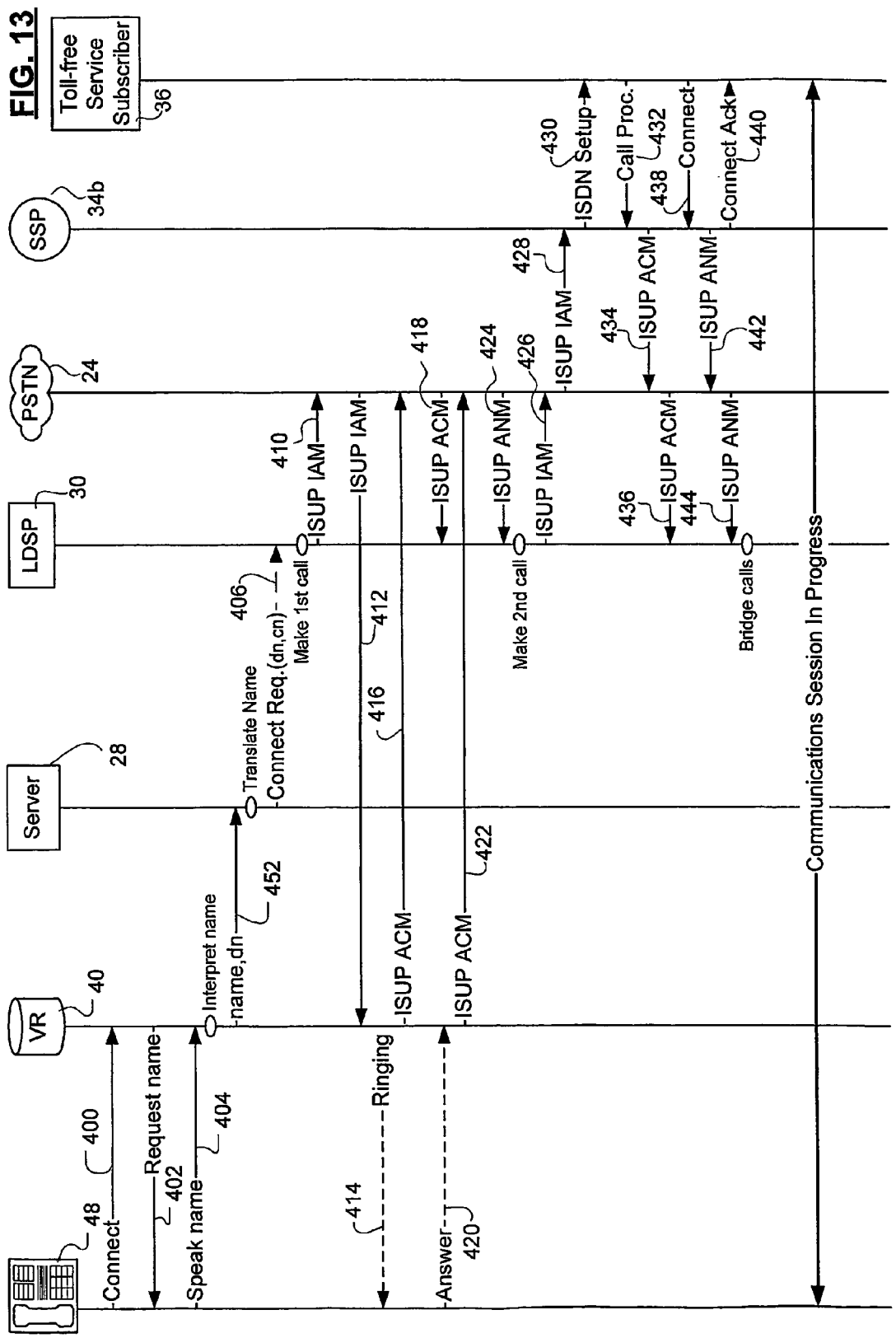
FIG. 13 is a call flow diagram illustrating principal steps in accordance with the invention for initiating a call using a voice connection to a voice response unit.

FIG. 13, is a call flow diagram that schematically illustrates how a telephone call terminated at a voice recognition database 40 in the PSTN 24 may generate the alphanumeric call initiator 42 containing the NAME 44. As shown in FIG. 13, a calling party uses a wireline (or wireless) telephone to connect (step 400) to a voice recognition database 40 by dialing a predetermined number in a manner well known in the art. On connection, the voice recognition database is programmed to request the name to which the calling party desires to place a toll-free call (step 402). In response to the prompt, the calling party speaks the name (step 404). The voice recognition database interprets the spoken name and finds a match. As is well known in the art, the match may be played back to the calling party for confirmation (not shown). The voice recognition database then formulates a call request containing the NAME 44 and an originating number (DN) which is preferably the number of the telephone 48 and forwards the request (step 452) to the server 28. The server 28 translates the NAME 44 to derive a conversion number (CN) and forwards the origination number and the conversion number to the LDSP 30 which was indicated in the translation to be the service provider to serve the call (step 406). Thereafter, call processing proceeds in steps 410-444 as described above with reference to FIG. 10.

Figure 14:
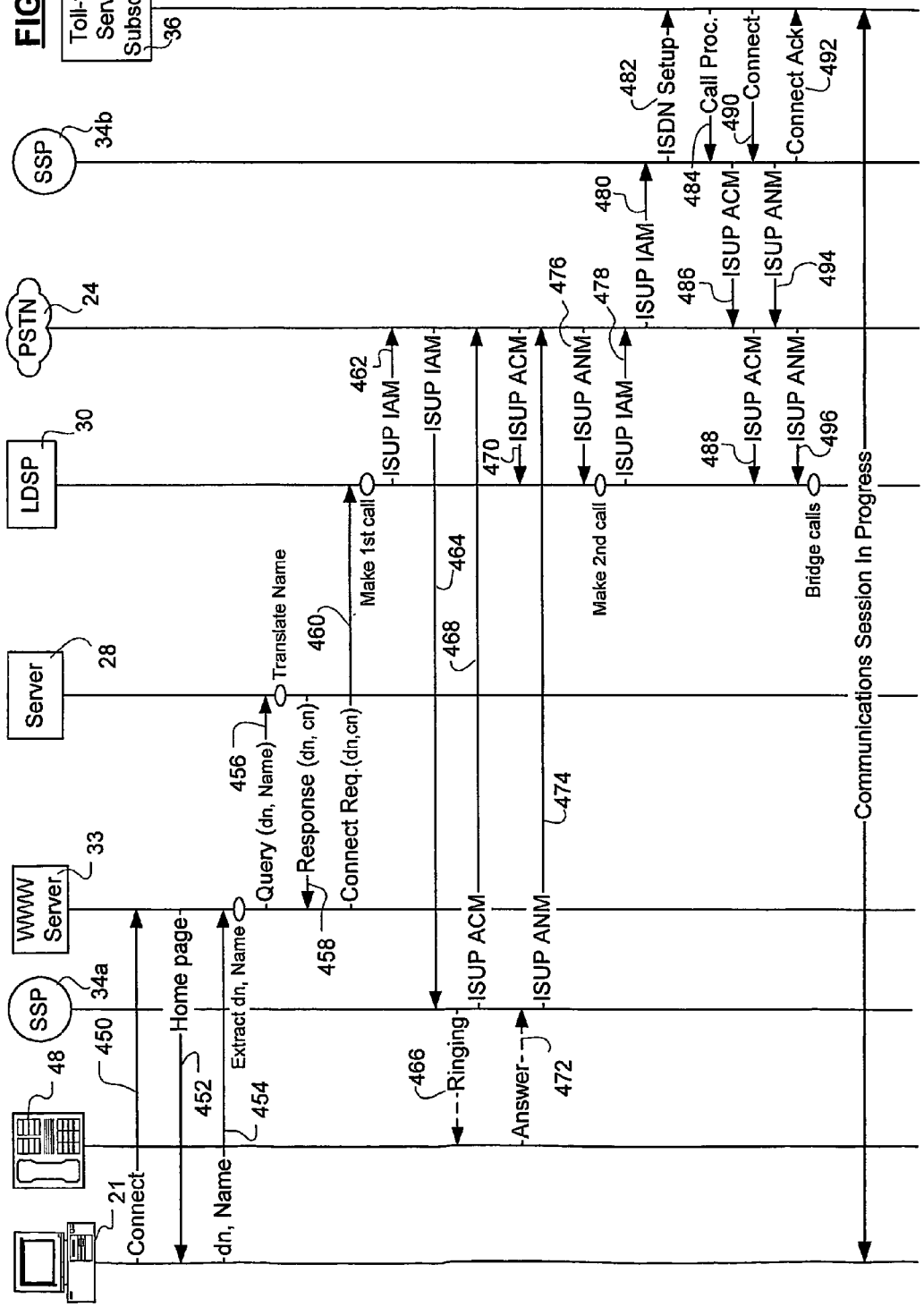
FIG. 14 is a call flow diagram illustrating principal steps in accordance with the invention for initiating a call using an alphanumeric string sent from an online computer.

FIG. 14 is a call flow diagram that schematically illustrates how a networked computer 21 may generate the alphanumeric call initiator 42 containing the NAME 44. As shown in FIG. 14, a calling party uses a networked computer 21 to connect (step 450) to a world wide web server 33. The world wide web server returns a home page (step 452), or the like which contains a form (FIG. 3a) for initiating a toll-free call using a NAME 44. In step 454, the calling party inserts the origination number (DN) and the NAME 44 into the form and forwards the form to the world wide web server 33. On receipt of the information, the world wide web server extracts the DN and the NAME 44. The world wide web server 33 then formulates a query containing the DN and the NAME 44 which is forwarded (step 456) to the server 28 which performs a translation to retrieve a conversion number for completing the call. A query response is returned to the world wide web server 33 in step 458. The query response contains the conversion number and other information, such as a IP address of a long distance service provider designated to complete calls to the toll-free service subscriber 36. On receipt of the response, the world wide web server formulates a connection request message to LDSP 30 and forwards the conversion number along with the directory number specified by the calling party. Thereafter, call setup shown in steps 462-496 are identical to those described above with reference to FIG. 10, with the telephone call being setup between a wireline telephone 48 specified as the originating number 42 by the calling party in the form forwarded in step 454 and the toll-free service subscriber 36.

Figure 15:
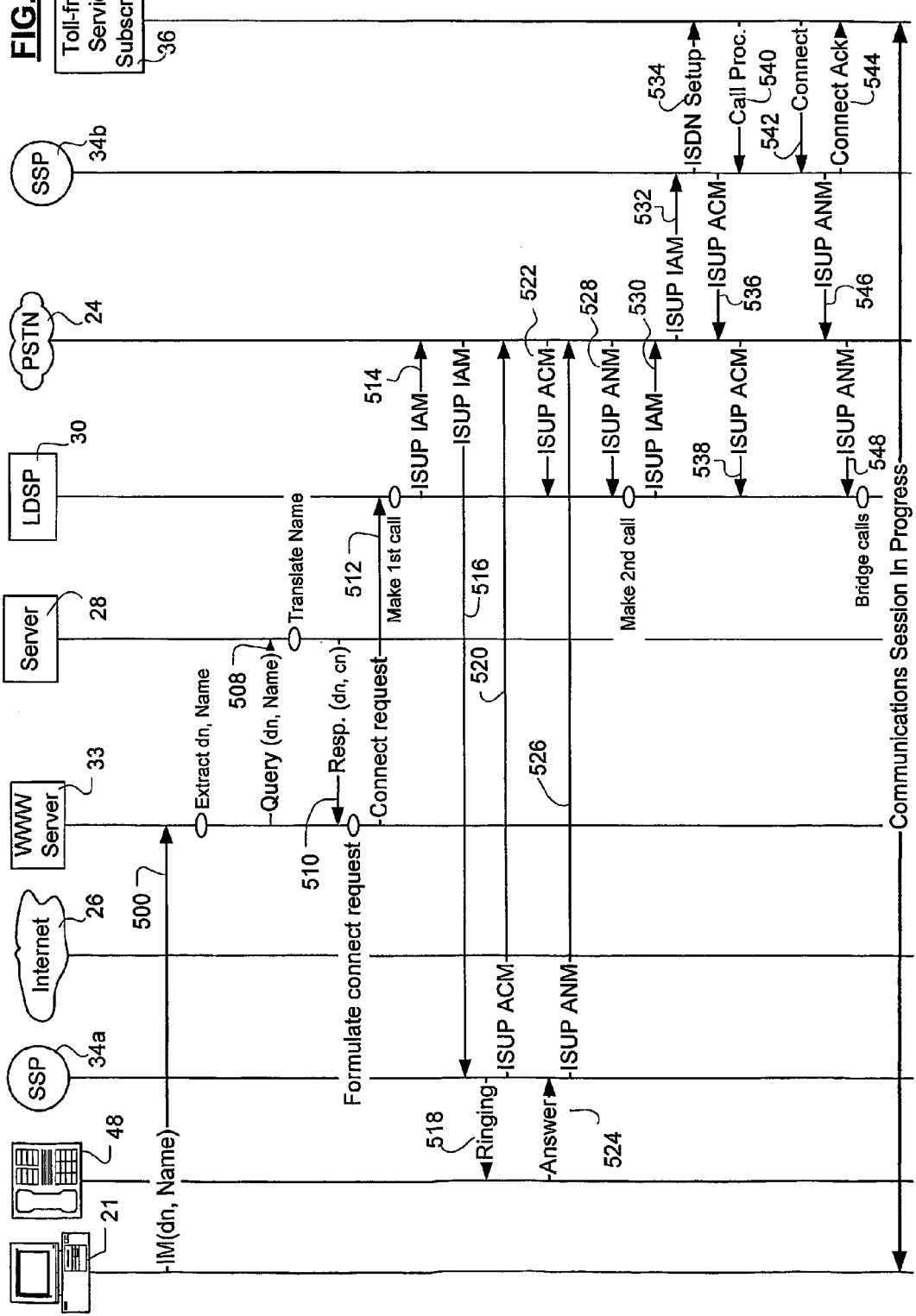
FIG. 15 is a call flow diagram illustrating principal steps in accordance with the invention for initiating a call using instant messaging.

FIG. 15 is a call flow diagram that schematically illustrates how a networked computer 21 may use an Instant Message to generate the alphanumeric call initiator 42. As shown in FIG. 15, a calling party using a personal computer 21 sends an Instant Message (step 500) containing the NAME 44 and the originating number 46 (DN) of a wireline telephone 48 to a world wide web server 33 which is registered as an Instant Message user in a manner known in the art. In receipt of the Instant Message, the world wide web server 33 extracts the origination number 46 and the NAME 44 and formulates a query which is forwarded in step 508 to the database server 28. The database server translates the name as described above and returns a response in step 510. Thereafter, the world wide web server 33 formulates a connection request which is forwarded in step 512 to the LDSP 30 and the call is completed in steps 514-548 as described above with reference to FIG. 10.

Figure 16:
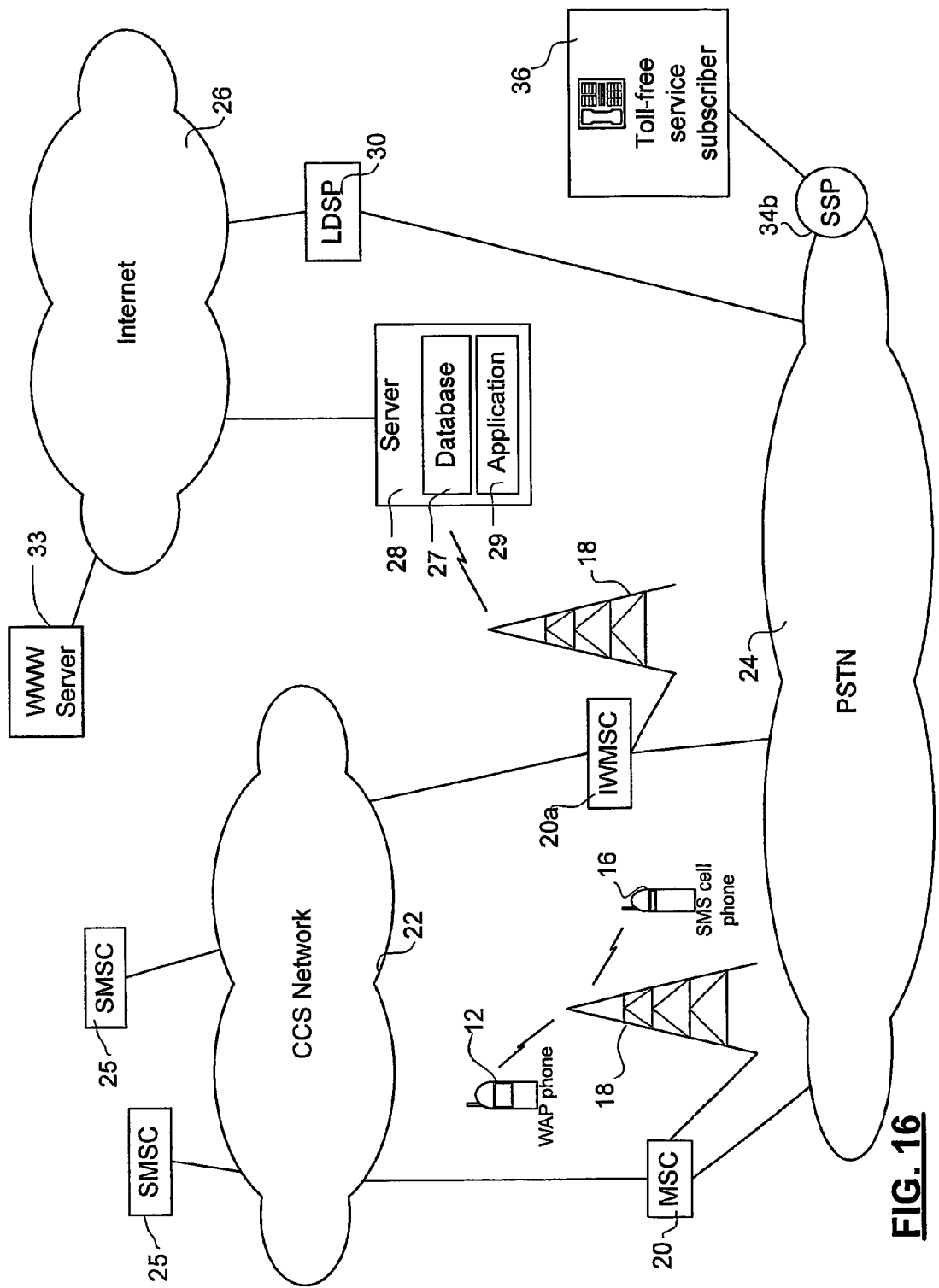
FIG. 16 schematically illustrates principal elements of yet another embodiment of a system in accordance with the invention.

FIG. 16 illustrates a system that enables SMs to be conveyed through an interworking (IWMSC) MSC 20a to the server 28. The network configuration in accordance with the embodiment shown in FIG. 16 enables the interworking MSC 28 to communicate wireless to forward short messages directly to a database server 28 equip with a wireless receiver. This network configuration considerable simplifies the messaging required in the network as explain below using the call flow diagram shown in FIG. 17. The interworking MSC (IWMSC) 20a operates in a manner known in the art.

FIG. 17 illustrates call setup using the system shown in FIG. 16. As shown in FIG. 17, a calling party using a SMS enabled cellular telephone 16 sends a SM containing a NAME 44 which is forwarded to the MSC 20 that servers the cellular telephone 16 (step 550). The SM may contain a destination number associated with server 28, or the network may be programmed to forward any message that does not include a destination to the server 28. The MSC 20 forwards the SM to the SMSC 25 (step 552) which relays the SM to the IWMSC 20a (step 554). The IWMSC then either relays the SM to the server 28 (step 556) or, alternatively, extracts the NAME and the telephone number of the calling party from the SM and forwards it wirelessly in a data message to the server 28 (not shown). The server 28 translates the NAME 44 as described above to retrieve a conversion number which is forwarded along with the calling party's telephone number in a connection request (step 558) to the LDSP 30 as described above with reference to FIG. 15. Thereafter, the call is setup in steps 560-594 as described above with reference to FIG. 10.

The invention therefore provides a plurality of network configurations and options for requesting and completing toll-free telephone calls using an alphanumeric call initiator that may be communicated to the network using SMS, electronic mail, voice or web interfaces. The network configurations and methods for obtaining, forwarding and translating a NAME 44 and an originating number 46 to the network are not exhaustive. The network configurations and methods described above therefore illustrates only some of the ways in which a toll-free call can be completed using an alphanumeric call initiator. It should also be understood by those skilled in the art that the toll-free service subscriber 36 may be any entity, including an individual and that call screening may be applied during translation of the name to ensure that only calls from selected originating numbers 46 are completed to the toll-free service subscriber.

The embodiments of the invention described above are intended to be exemplary only. The scope of the invention is therefore intended to be limited solely by the scope of the appended claims.

The invention claimed is:

1. A method for providing toll-free call origination in a telephone network, compromising:

storing in a data structure associated with a toll-free management system, at least one record comprising a name and information used for selecting a directory number used to complete calls to a toll-free service subscriber receiving a toll-free call initiation request message from a message sender connected to a data network, the toll-free call initiation request message being in a predefined format containing the name of the toll-free service subscriber and a telephone number specified by the message sender from which the toll-free call is to be initiated;

querying the data structure using the name contained in the call initiation request message to locate a record associated with the toll-free service subscriber in the data structure of the toll-free management system;

selecting a conversion number from the record associated with the toll-free service subscriber using predefined selection criteria;

using the name to determine a directory number to be used to complete the call to the toll-free service subscriber;

initiating a call connection between the telephone number specified by the message sender and the toll-free service subscriber;

sending a first connection request message to a service center to establish a first connection with the telephone number specified by the message sender;

sending a second connection request message to the service center to establish a second connection between the service center and the conversion number used to complete calls to the toll-free service subscriber; and bridging the first and second connections after both connections are established.

2. The method as claimed in claim 1 wherein the step of storing at least one record in the data structure comprises a step of storing a toll-free directory number that is used to invoke incumbent toll-free translation services in a PSTN to perform a translation for determining a conversion number used to complete calls to the toll-free service subscriber.

3. The method as claimed in claim 1 further comprising a step of returning an error message to a device that issued the call initiation request name failed to match any records in the data structure.

4. The method as claimed in claim 1 wherein the predefined selection criteria comprise at least one of:
   origination directory number information associated with the telephone number specified by the message sender;
   time of day;
   day of week; and
   availability of communication equipment serving the toll-free directory number.

5. The method as claimed in claim 1 further comprising:
   providing a voice recognition database in a PSTN adapted to capture the name spoken by a calling party that has established a connection to the voice recognition database by dialing a predetermined number, the voice recognition database being further adapted to formulate the call initiation request message containing the name and a telephone number specified by the calling party.

6. The method of claim 1 further comprising:
   selecting the service center using originating number information associated with the telephone number specified by the message sender and the conversion number to control a cost of the connection between the telephone number specified by the message sender and the conversion number.

7. A system for providing toll-free call origination comprising:
   means for storing in a data structure associated with a toll-free management system, at least one record comprising a name and information used for selecting a directory number used to complete calls to a toll-free service subscriber;
   means for receiving a toll-free call initiation request message in a predefined format containing the name identifying the toll-fine service subscriber and a telephone number to be used as a call originating number for the toll-free call;
   means for querying the data structure using the name contained in the call initiation request message to locate a record associated with the toll-free service subscriber in the data structure of the toll-free management system;
   means for selecting a conversion number from the record associated with the toll-free service subscriber using predefined selection criteria;
   means for using the name to determine a toll-free directory number,
   means for initiating a call connection between the telephone number to be used as the call originating number for the toll-free call and the toll-free directory number;
   means for sending a first connection request message to a service center to establish a first connection with the telephone number specified by the message sender;
   means for sending a second connection request message to the service center to establish a second connection between the service center and the conversion number used to complete calls to the toll-free service subscriber; and
   means for bridging the first and second connections after both connections are established.

8. The system as claimed in claim 7 wherein the means for receiving comprises a server connected to a data network through which the toll-free call initiation request message is received.

9. The system as claimed in claim 8 wherein the server comprises the data structure and a data structure management application.

10. The system as claimed in claim 9 wherein information used for selecting the toll-free conversion number comprises a toll-free directory number that is used to invoke incumbent toll-free translation services in a PSTN to perform translation for determining the conversion number.

11. The system as claimed in claim 7 wherein the means for querying the data structure comprises means for returning an error message to the dc-vice that issued the toll-free call initiation request message if the name failed to match any records in the database.

12. The system as claimed in claim 11 wherein the means for selecting a conversion number comprises means for using predefined selection criteria to select the conversion number.

13. The system as claimed in claim 12 wherein the means for using predefined selection criteria comprises database records that specify selection criteria related to at least one of:
   information associated with the telephone number to be used as the call originating number for the toll-free call;
   time of day;
   day of week; and
   availability of communication equipment serving the toll-free service subscriber.

14. The system of claim 7 further comprising:
   means for selecting the service center using originating number information associated with the telephone number specified by the message sender and the conversion number to control a cost of the connection between the telephone number specified by the message sender and the conversion number.

* * * * *